(12) United States Patent
Solheim et al.

(10) Patent No.: US 7,472,590 B2
(45) Date of Patent: Jan. 6, 2009

(54) AUTONOMOUS CONTINUOUS ATMOSPHERIC PRESENT WEATHER, NOWCASTING, AND FORECASTING SYSTEM

(76) Inventors: Hunter Solheim, 130 Mohawk Dr., Boulder, CO (US) 80303; Fredrick Solheim, 130 Mohawk Dr., Boulder, CO (US) 80303

( * ) Notice: Subject to any disclaimer, the term of this patent is extended or adjusted under 35 U.S.C. 154(b) by 0 days.

(21) Appl. No.: 11/796,712

(22) Filed: Apr. 30, 2007

(65) Prior Publication Data
US 2008/0264164 A1    Oct. 30, 2008

(51) Int. Cl.
*G01W 1/00* (2006.01)
(52) U.S. Cl. .................. 73/170.16; 73/170.27
(58) Field of Classification Search .......... 73/170.16; 342/26
See application file for complete search history.

(56) References Cited

U.S. PATENT DOCUMENTS 6,184,816 B1 *   2/2001   Zheng et al. .......... 342/26 R
6,456,226 B1 *   9/2002   Zheng et al. .......... 342/26 R
6,563,452 B1 *   5/2003   Zheng et al. .......... 342/26 R

* cited by examiner

*Primary Examiner*—Andre J Allen
(74) *Attorney, Agent, or Firm*—Harold A. Burdick (57) ABSTRACT

Apparatus and methods for passively and remotely and continuously locating, monitoring, and measuring present weather and nowcasting and forecasting weather and meteorological phenomena and parameters by utilizing observations of infrared emissions and reflections are disclosed. Based on observations of an instrument such as an infrared noncontact thermometer, the methods provide useful information on the presence of aerosol, dust, cloud, and precipitation for the purpose of determining present weather, weather tracking, weather nowcasting, and weather forecasting as well as other weather phenomena. One embodiment of this invention is an infrared sensor pointed vertically and reflected from a suitable mirror rotating about a vertical axis such that the field of view of the sensor scans azimuthally at an elevated angle above the horizon.

22 Claims, 6 Drawing Sheets

AUTONOMOUS CONTINUOUS ATMOSPHERIC PRESENT WEATHER, NOWCASTING, AND FORECASTING SYSTEM

FIELD OF THE INVENTION

This invention relates to operation and reduction of observations of instruments capable of sensing of certain signatures of atmospheric phenomena. Said signatures can then be interpreted into usable characterization of said atmospheric conditions and phenomena for the purposes of determining present conditions and nowcasting and forecasting weather.

BACKGROUND OF THE INVENTION

It is a problem in the field of atmospheric meteorological and other parameter measurement to passively, remotely, inexpensively, and continuously measure these parameters. Active remote sensing systems emit often objectionable or unacceptable radio or light energy and are power consumptive. Front-end, operating, and maintenance and repair costs can be high.

Every substance that is above absolute zero in temperature emits radiation across the entire electromagnetic spectrum in accord with the quantum mechanical Planck function defined in Equation 1 below.

$$I(\lambda, T) = \frac{2\pi hc^2}{\lambda^5 [e^{hc/\lambda kT} - 1]} \quad (1)$$

I is radiated power per wavelength interval,
λ is the wavelength of the radiation
h=Planck's constant,
k is Boltzmann's constant,
T is temperature,
c is speed of light.

The residual radiation temperature of outer space from the Big Bang is about 3 Kelvins, or minus 270 degrees Celsius. The gases in a cloudless sky emit radiation proportional to their physical temperature and add to downwelling 3 Kelvin cosmic radiation, yielding a temperature as sensed in the 8 to 14 micron window region as cold as minus 100 Celsius or colder. If significant water vapor or aerosols or dust are present in a cloudless sky, this infrared temperature can be warmed to minus 50 Celsius or warmer. Due to absorption and scattering by water droplets, infrared radiation has a short photon path length in clouds, and therefore emanates from the cloud margins. Thus the infrared temperature seen of a cloud is simply the local physical temperature of the edge of the cloud, plus a small contribution to temperature due to the absorption and emission of the intervening atmosphere. By knowing or estimating the temperature profile of the atmosphere and measuring the cloud temperature, one can determine the altitude and range of the cloud.

This is true for water in liquid or ice phase. It is also true for hydrometeors such as rain and snow that the infrared radiation path length is short and therefore radiation from the margins of precipitation volumes reflects the local physical temperature.

By remotely measuring the above temperatures across regions of the sky, much can be determined regarding the present content and meteorological state, evolution, and future state of said state and content of the atmosphere. Because the cloudless atmosphere is somewhat transparent in the 8 to 14 micron region of the spectrum, observations of meteorological phenomena such as clouds and precipitation in this spectral region are preferred.

Many measurement systems that characterize parameters of the atmosphere have negative aspects and attributes. Radars, LIDARs, and other atmospheric sensor systems are power consumptive, are costly, and often are comprised of expensive finite lifetime components. Operational costs can therefore be high. Operational weather radars also cannot detect and track very small cloud droplets because the reflected signal is roughly proportional to the 6th power of the droplet diameter. Radiation emitted by active remote sensing systems is sometimes intrusive, hazardous to health, and in some military and like applications, compromises covertness. It is therefore an object and characteristic of the present invention to be very low power, on the order of several watts, capable of fast sampling rates, inexpensive to purchase, implement, and operate, and be completely passive and safe in that it emits no radiation signal. Stand-alone, the invention can inexpensively yield valuable information relating to the state and content of the atmosphere.

Additionally, some atmospheric sensor systems are functional only under certain atmospheric conditions. Radars return signal only when significant clouds are present, LIDARs and Fourier Transform Interferometers (FTIRs) do not operate through cloud. It is therefore an object of the present invention to yield signal that can command the commencement and cessation of operations of other such sensing systems based on sky conditions, thereby creating cost savings.

The present low cost invention is suitable for autonomous operation at remote unattended sites to observe present weather, visibility, and other atmospheric content and conditions and to forecast said parameters. For instance, the invention could report sky conditions and ceiling height at unattended airports to incoming air traffic. It can also detect and report fog, cloud structure and type (e.g., stratus, cumulus, cirrus), define sky coverage types (scattered, broken, fraction, quadrants occupied, and persistence of cloud cover). It can additionally report frontal passages, and give advance notice and prediction of the time of frontal passage. It can also characterize precipitation type and intensity. Because it senses thermal emissions, it operates equally well in daylight and darkness.

Infrared noncontact thermometers have heretofore been utilized in a zenithal mode to simply measure cloud base temperature, but heretofore not in the surveillance mode and not with the interpretative and predictive capabilities of the present invention.

SUMMARY OF THE INVENTION

This invention provides apparatus and methods for continuously determining the meteorological state, visibility, and other states and parameters of the atmosphere in the vicinity of said apparatus. The invention can also herald impending changes in said conditions and parameters and nowcast and forecast said impending conditions. The invention employs an infrared noncontact thermometer alone or in conjunction with optical steering such as pointing positioners or mirrors, with data gathering or presentation systems, and can also implement data interpretation and processing and reporting systems. The invention can be utilized in concert with other atmospheric sensor systems such as in situ meteorological temperature, relative humidity, and wind systems and active and passive atmospheric remote sensing systems, visibility and ceiling measurement devices, windfinding radars, and microwave radiometers.

Apparatus of this invention act to measure emitted and/or reflected infrared radiation in a narrow or wide field of view (FOV) directed toward a single or plurality of directions in the sky. It is an object of this invention to therefore characterize certain locations or areas of the sky, or the entire hemispheric region of the sky, either by staring or by continuous or stepwise scanning.

It is an embodiment of this apparatus and method wherein the receiving antenna is pointed at an elevation angle relative to the horizon. It is a further embodiment of this apparatus and method wherein the receiving antenna is pointed, steered, or scanned in an azimuthal direction. It is yet a further embodiment of this apparatus and method wherein the pointing or steering is directed through a plethora of angles in elevation above the horizon. It is yet a further embodiment wherein the pointing or steering is directed through a combination or series of combinations of azimuthal and elevation angles.

It is another embodiment of this invention to provide apparatus and method to include other ancillary data sources in concert such as weather models, weather forecasts, satellite, GPS refractivity and water vapor, LIDAR, FTIRs, aircraft borne sensors, lower boundary layer in situ, climatological, diurnal and seasonal effects, and/or other such observations and information to augment and improve the skill of the interpretations and nowcast and forecast ability of the invention. To this and other purposes it can also be utilized in concert with radars, wind profilers, and surface wind and relative humidity measurements. These observations and information can be utilized to complement or augment the skill of the system in characterizing present atmospheric contents and conditions and their trends.

It is yet another object of this invention to provide a method to process and interpret the observations and the time series thereof to predict certain constituency and meteorological properties and trends and expected future states of the atmosphere.

It is yet another object of this invention to provide a method and apparatus to display observations of the invention. It is yet another object of this invention to provide a method and apparatus to display interpretations of observations of the invention. It is yet another object of this invention to provide a method and apparatus for storing said observational data and/or interpretations, and/or to transmit said information to external devices.

With these and other objects and methods in view, which will become apparent to one skilled in the art as the description proceeds, this invention resides in the novel construction combination, and arrangement of parts and methods substantially as hereinafter described, and more particularly defined by the appended claims, it being understood that changes in the precise embodiment of the herein disclosed invention are meant to be included as come within the scope of the claims.

DESCRIPTION OF THE PREFERRED EMBODIMENT

Figure 1:
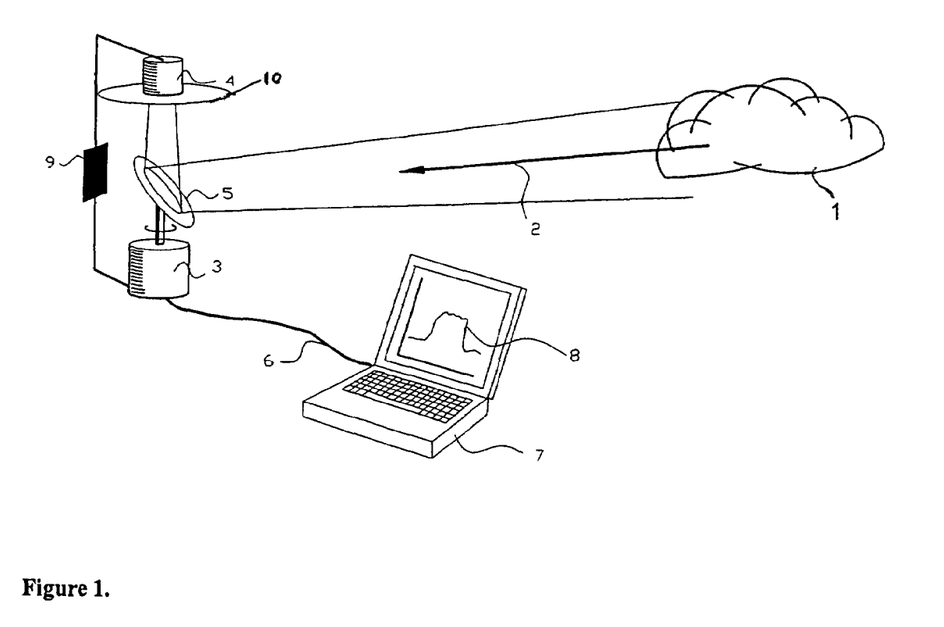
FIG. 1 presents an embodiment of the observing apparatus in perspective view, including a processing and recording device.

A first embodiment of an apparatus for passively and remotely locating, monitoring, measuring, and/or predicting certain atmospheric and meteorological parameters is shown in FIG. 1. Infrared emissions 2 originating from an atmospheric feature I are reflected from mirror 5. Mirror 5 is an efficient low loss reflector of infrared such as the Edmund Scientific K32-089 first surface gold mirror or other suitable construction and material. Said emissions are directed by mirror 5 into infrared detector system 4. A suitable infrared detector system is the Raytek Thermalert™ MID™ system, operating in the 8 to 14 micron region, having an angular field of view of about 5 degrees, and outputting analog and digital information relating to the temperature of the object(s) in the field of view. This system consumes about 1 watt of power. This system also conveniently reports surface ambient temperature. Other commercially available noncontact thermometers are the Everest Interscience 4000ZL and the Heitronics KT15. These sensors are utilized in food, manufacturing, chemical, and other such processes where physical contact is undesirable, difficult, or not possible.

Said information is conveyed to recording, processing, and display subsystem 7 through communication and power cable 6. Said communication and power cable provides power to the infrared detector system and to mirror azimuth positioning actuator 3. Said azimuth positioning actuator can be a motor, motor/gearbox, stepper motor, or similar device, and can report its angular position by way of an angular resolver or index or other reporting system. Time series, azimuthal, and other display formats of the infrared sensor measurements are presented at 8, and said data are stored in subsystem 7. Subsystem 7 is a laptop, notebook, or other simple computer system. Detector 4 as well as mirror rotational axis are preferably aligned in a zenithal direction. Mirror azimuth positioning actuator 3 stepwise moves or continuously rotates the mirror 5 at a preselected rate, directing the field of view of the sensor 4 at an elevated angle above the geometric horizon. A rotational rate of 1 revolution per minute is suitable, making a simple wall clock motor a suitable driver for a simple invention system. The synchronous motor of an a.c. wall clock allows precise rotational rate, making azimuth determination more accurate. The rotational or azimuthal position of the field of view can be determined by implementing optional ambient temperature target 9 such that the system reads this target temperature as the field of view passes this target with each rotation. This reference could also be a small incandescent bulb or an infrared light emitting diode. As the rotational rate can be kept constant, by knowing the azimuthal direction of the target relative to the mirror system, the azimuthal position of the field of view at any time can be readily determined. Alternatively, any number of indexing or angular resolving systems can be implemented.

Figure 2:
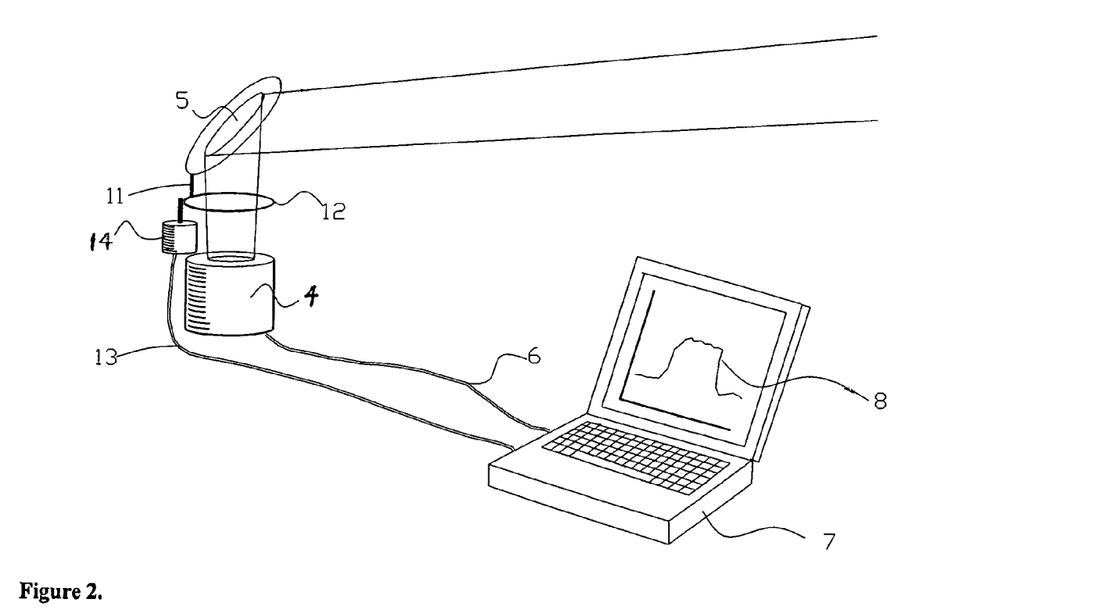
FIG. 2 presents another embodiment of the invention wherein the infrared sensor is located above the scanning mechanism.

A more elegant embodiment of an apparatus for passively and remotely locating, monitoring, and measuring certain atmospheric and meteorological parameters is shown in FIG.

2. In this embodiment, mirror 5 is attached to and supported by annular ring 12 through which the infrared detector field view can pass unobstructed by any structure or contamination of the observation. Annular support ring 12 can be rotated about its center by azimuth positioning actuator 14. Azimuth positioning actuator 14, powered and controlled through interconnect cable 13, engages annular support ring 12 with meshing gears or belt drive or other suitable coupling. This embodiment allows views at all azimuth angles unobstructed by any structure of the invention. The azimuthal position of the mirror, and therefore the direction of the field of view of the infrared detector, can be determined with a standard angular resolver coupled to the angular ring and reporting to recording, processing, and display subsystem 7.

Figure 3:
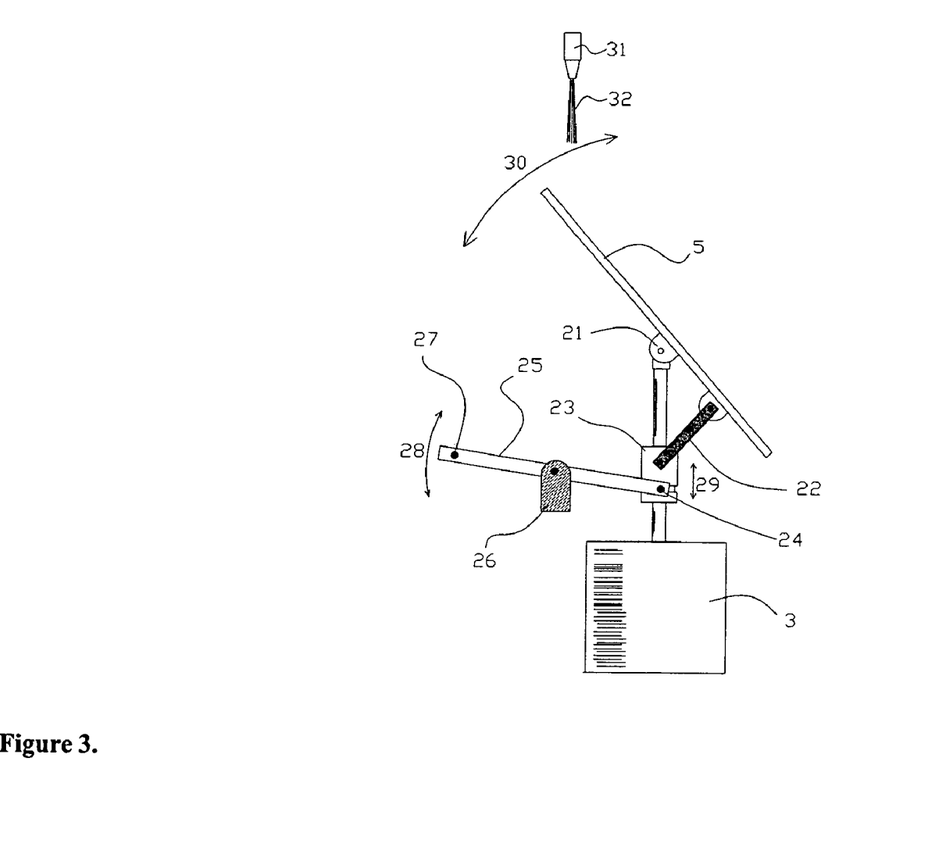
FIG. 3 presents a mechanism whereby the field of view of the invention can be scanned through a vertical plane.

The descriptions of the above embodiments demonstrate the ability to steer to all azimuth angles at constant rates or at will. An embodiment of a subsystem that enables the ability to steer to desired elevation angles of the field of view above the horizon is shown in FIG. 3. This embodiment enables adjustment of the elevation of the field of view of the sensor without interfering with the azimuthal steering of the invention. Mirror 5 is attached by way of a pivot to the rotating shaft of azimuth positioning actuator 3. Said pivot is such that the mirror can rotate in angle relative to the axis of the azimuth positioning actuator shaft, but is constrained to rotate with the azimuth positioning actuator shaft. Collar 23 is located on the shaft and is free to move up and down relative to the azimuth positioning actuator and to rotate independent of the rotation of the shaft. Link 22 fixes the up and down motion of the collar 23 relative to mirror 5. Lever arm 25 pivots on 26, a pivot that is fixed relative to azimuth positioning actuator 3. Lever arm 25 is engaged to collar 23 by way of a forked coupling, dowels of which engage the recessed annular feature in collar 23 such that the collar can rotate relative to lever arm 25, but is moved in a transverse direction along the azimuth positioning actuator shaft by motion of the lever arm. Lever arm is moved through an arc by an actuator, not shown, attached at 27.

Motion 29 at actuator attach location 29 causes motion 29 of collar, motion which is translated through link 22 to the mirror 5 causing mirror rotational motion 30 in a vertical plane. Said motion directs the field of view of the invention in a vertical plane.

Making such mapped infrared thermometric emission measurements in azimuthal directions and at various elevation angles of the FOV yields information on a number of meteorological phenomena of interest.

Precipitation and particulate matter settling on the optical surfaces of the invention can contaminate the measurements of said invention. To remedy this, clean and dry compressed air is fed into nozzle 31, causing a jet of air 32 to exit. Said jet is directed onto the optical surfaces to free them from contaminants, or to avoid contaminants settling on them. Said jet can be heated to mitigate freezing rain. An alternative or supplementary method of shielding the optical system components from contamination by precipitation or other particulates is shown as the cover or shelter 10.

For many applications in this patent that utilize only the infrared thermometric emission measurements, highly accurate absolute calibration is not necessary, nor is long term stability of the radiometer receiver, as relative temperature measurement contain significant information on the state and content of the atmosphere. This greatly simplifies the hardware requirements.

Figure 4:
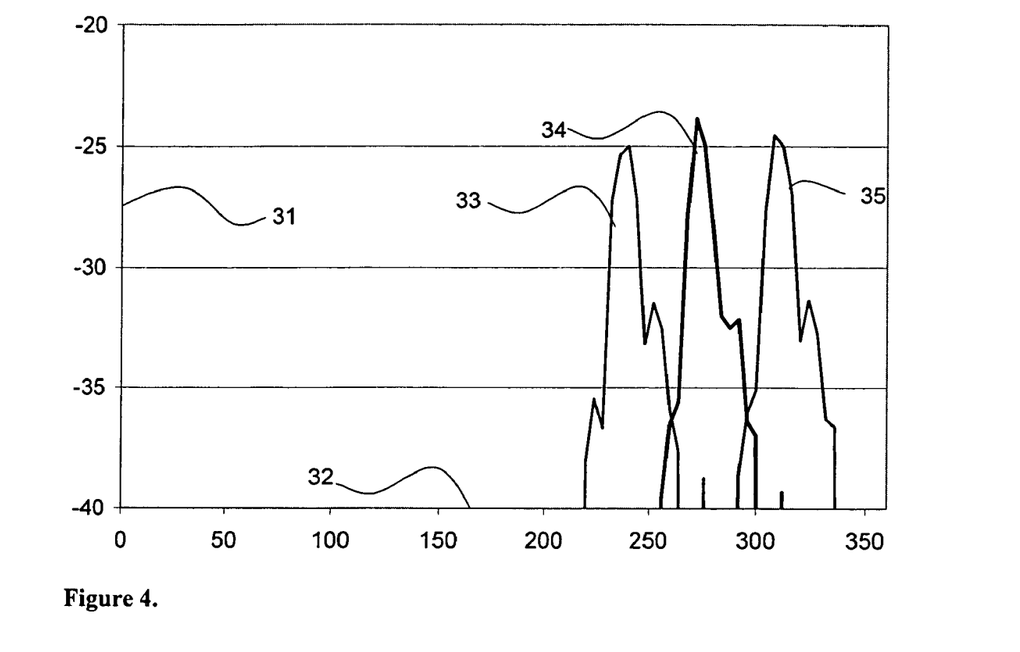
FIG. 4 presents several azimuthal scans of the invention spaced in time, presenting the evolution in time of the azimuthal position of a weather phenomenon.

FIG. 4 demonstrates the azimuth tracking ability of the invention by performing azimuthal scans at a low elevation angle above the horizon by the invention and by observing time series of zenith-mapped low elevation angle azimuthal scans of infrared thermometric emission. The temperature measured by the invention is plotted on the vertical axis 31 in degrees Celsius against the azimuth or compass angle 32 in angular degrees. In the absence of clouds in the field of view of the invention reports a clear-sky temperature colder than −40 Celsius. The presence of cloud in the field of view is evidenced by the temperature peaks at 33, 34, and 35. These scans 33, 34, and 35 are spaced in time and reveal angular displacements of the detected cloud from southwest to northwest.

The earth's atmosphere is constrained by the perfect gas law and the hydrostatic equation and can be further defined by the laws of fluid dynamics and other circulatory and radiative transfer equations. These constraints and physical processes, combined with solar heating, radiative heating and cooling, convective circulation and heat transfer, transport of water in all three of its phases, weather events and features, as well as other thermodynamic processes, cause the atmosphere to have a fall-off in atmospheric temperature between the dry adiabatic lapse rate of the atmosphere of 9.8 Celsius/kilometer, and the moist adiabatic rate of 4.9 Celsius/kilometer, and very consistently about 7 Celsius/kilometer (7.1 Celsius/kilometer for Denver Colo., year round) from about 500 meters of altitude to above 10 km of altitude above the ground. This physical characteristic of the atmosphere is implemented in the present invention to estimate height and/or range of clouds, as demonstrated in the following simplified and unrefined algorithms (2), (3), and (4).

$$\text{cloud height (kilometers)} = (T_{FOV} - T_{ambient}) \times (7 \text{ degrees/kilometer}) \quad (2)$$

$$\text{cloud range} = \text{cloud height}/\sin(\text{elevation angle}) \quad (3)$$

$$\text{cloud horizontal distance} = \text{cloud height}/\tan(\text{elevation angle}) \quad (4)$$

Here $T_{FOV}$ is the infrared temperature measured in the field of view of the instrument, and $T_{ambient}$ is the physical air temperature at the surface of the earth. Said algorithms can be improved in their skill with a refinement of parameters and physical models and mathematical representations.

Figure 5:
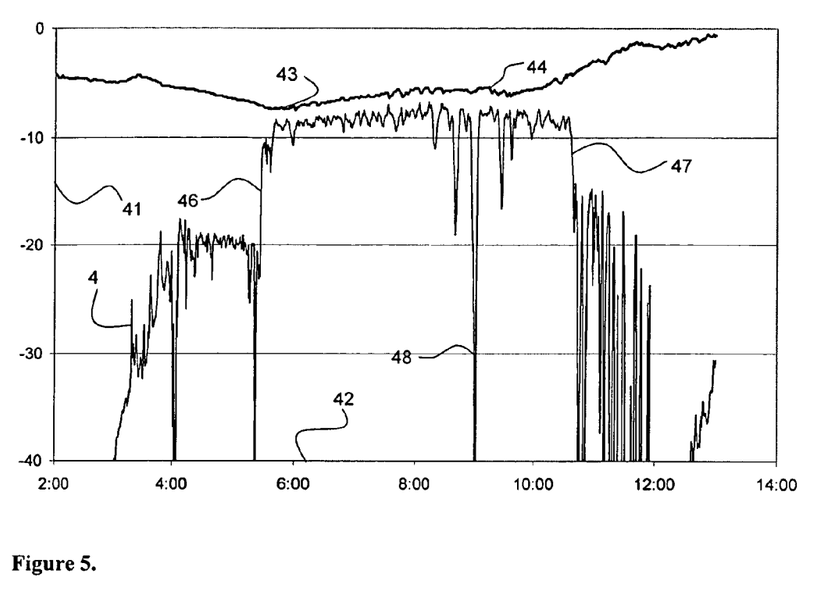
FIG. 5 presents a 12 hour time series of fixed stare observations detecting the approach of clouds, the evolution of ground fog, and the clearing of these meteorological phenomena.

FIG. 5 presents observational data over a 12 hour period with the invention staring westward at an elevation angle of about 20 degrees above the horizon. The plot is of temperature of the FOV in Celsius on the vertical axis 41 against time in hours on the horizontal axis 42. The upper trace 43, 44 is the outdoor ambient temperature, and the trace 45, 46, 48, 47 is the temperature of the cloud in the field of view of the invention. The cloud is forming at 45 and is highly structured and broken in nature as is evidenced by the highly varying temperature trace in the vicinity of 45. Said cloud at 45 is about minus 20 degrees Celsius, whereas the ambient surface temperature is about minus 5 Celsius. Application of the average tropospheric temperature lapse rate of about 7 Celsius per kilometer of altitude determines that this cloud is at about 2 kilometers of altitude above the invention. In aviation terms, the ceiling is therefore 2 kilometers above the airport. The 20 degree elevation angle of the field of view of the invention places this cloud at a horizontal range of about 7.2 kilometers.

The ambient temperature is decreasing after sunset at 43, causing the onset of ground fog formation at 46 and thereafter by cooling the air below its dewpoint temperature wherein the air is saturated with respect to water vapor in that the concentration of water vapor that it can hold is less than the original amount of contained water vapor. Small droplets of water or crystals of ice then form. Shortly after local sunrise around 7:00 the ambient temperature is increasing at 44 by solar heating and the fog begins to thin and break up, with holes in the fog appearing at 48. At 47 the fog suddenly dissipates.

Cold and warm weather fronts form an approximately wedge shaped feature in the atmosphere. In the case of a cold front, the cold air drives under the warmer air mass, creating a frontal boundary that slopes rearward from the surface frontal interface with a slope of approximately 1:100, or 1 km of height for each 100 km of distance. Warm fronts have a frontal boundary slope of approximately 1:200 wherein the warm air mass rides up over the colder air mass, often forming cirrus clouds as much as 1000 km in advance of the surface front, and then altostratus or stratus as much as 500 km in advance of the surface front.

Figure 6:
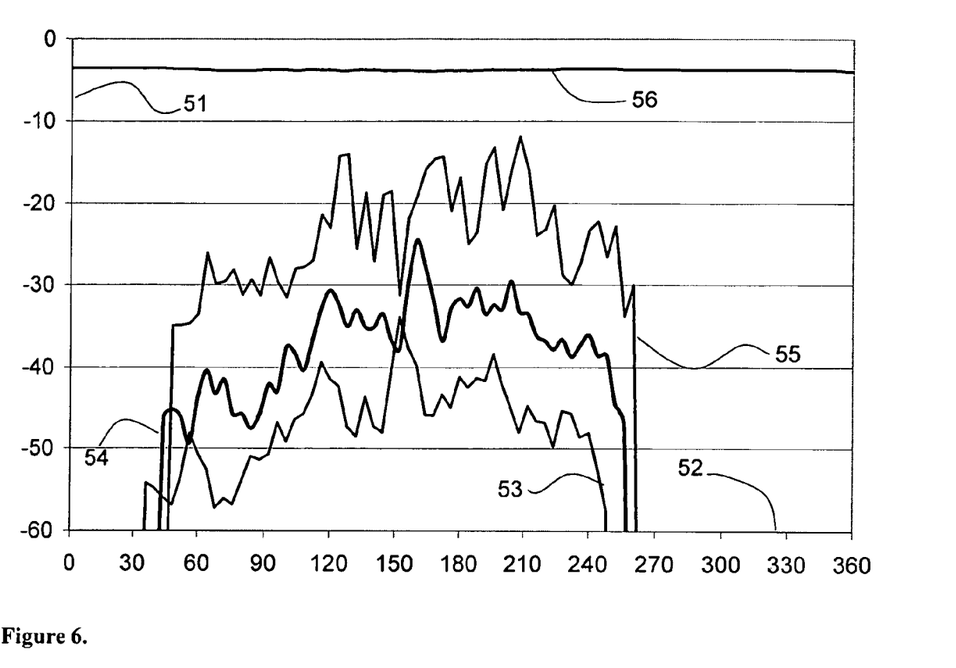
FIG. 6 presents azimuthal scans that detect the approach of cloud cover such as a frontal system.

The data in FIG. 6 depict the growth of a cloud feature. Such a progression would be characteristic of an approaching warm front wherein the cloud cover at the frontal interface descends as the front approaches the invention. The temperature measured in the field of view of the azimuthally scanning invention is plotted on the vertical axis 51, whereas the azimuth of the scanned sensor field of view is plotted in degrees on the horizontal axis 52. The azimuthal scans are performed at a constant angle of elevation above the horizon. Successive scans 53, 54, and 55 reveal an increasing temperature over an azimuth of approximately 180 degrees. The scans are separated by several hours in time. In each scan interval the observed temperatures are increasing by about 10 degrees Celsius, equivalent to lowering of the underside of the cloud feature by about 1.3 kilometers between each scan interval as the warm front approaches. The ambient temperature 56 is about minus 4 Celsius. In this example the front will arrive at the surface in about 1 more scan interval. Thus the invention can herald the approach of fronts as much as a day or more in advance of the frontal passage. A simplified and unrefined algorithm for determination of time of passage of a frontal system is expressed in (5):

$$\text{Time to frontal passage} = (T_{FOV} - T_{ambient})/(\text{change in } T_{FOV}/\text{unit time}) \quad (5)$$

The present invention can also measure percentage cloud cover, direction of cloud cover, and trends in cloud cover. A simple algorithm expressing percentage of cloud cover for a scanning embodiment of the invention is expressed in equation (6) below:

$$\% \text{ coverage} = (\# \text{ of observations above a baseline } T_{FOV} \text{ per revolution})/(\text{total number of observations per revolution}) \quad (6)$$

The present invention can also characterize cloud types such as stratus, cumulus, altostratus, cumulonimbus, cirrus, and other cloud types, and can measure the percentage of sky cover of each, by observing the time series, the time rate of change of $T_{FOV}$ or azimuthal angular dependence of the $T_{FOV}$, the amplitude of said change, and the overall pattern of said changes. The time series or azimuthal angular dependence mimic the structure of the underside of the cloud. For example, as their name implies, stratus clouds are uniform in areal extent and are therefore characterized by a $T_{FOV}$ that is constant. The difference between $T_{FOV}$ and $T_{ambient}$ determines the height of said clouds, and therefore determines if they are altostratus, stratus, cirrus, or intermediate types. Cumulus clouds are interspersed with clear sky regions of subsidence of clear air, and the $T_{FOV}$ signature is accordingly clumpy.

The present invention can also characterize precipitation types and intensity. Ground fog yields a $T_{FOV}$ within a few degrees Celsius of $T_{ambient}$ and is further characterized by a sudden onset and a smooth time series of $T_{FOV}$ as seen in FIG. 5. Snow is characterized by a slower onset, a $T_{ambient}$ below 0 Celsius, and a smooth $T_{FOV}$ with a greater spread from $T_{ambient}$. Rain is characterized by a $T_{ambient}$ above 0 Celsius, a cooling trend at the onset of rain, and a very small spread of $T_{FOV}$ from $T_{ambient}$.

Infrared sensor systems are inexpensive and can be managed by a single computer or data acquisition and processing system. In yet another embodiment, multiple infrared sensors are utilized to simultaneously observe at separate azimuth and/or elevation angles, enabling greater sky coverage. This plethora of sensors can be configured to stare at fixed directions or to scan in azimuth and/or elevation.

The system can be made an expert system by including the ability of interpretative and predictive processes such as artificial neural networking wherein the output of the invention is mated with concurrent observations of other systems that have similar capabilities. Such other systems include other present weather, weather nowcasting, and weather forecasting systems such as radars, microwave radiometers, LIDARS, surface meteorological sensing systems, GPS phase delay and position measurements, satellite soundings of temperature and humidity, satellite thematic mapping systems, and other such systems.

As may be appreciated from the foregoing, this invention employing simple and inexpensive infrared sensors can be utilized in staring or scanning modes to obtain temperature measurements that can be displayed, processed, stored, and/or transmitted. Such observations can remotely and autonomously characterize and/or herald conditions and/or content of the atmosphere

What is claimed is:

1. For detecting, depicting, tracking, recording, or forecasting atmospheric phenomena, a ground based apparatus comprising:
   an infrared reflector reflecting emissions emanating from the margins of clouds in the atmosphere;
   an infrared sensing detector sensitive to said emissions positioned to receive emissions reflected by said reflector and providing an output;
   means for observing and recording said output; and
   data processing means for processing said output and providing processed output for characterizing, nowcasting and forecasting of weather.

2. The apparatus of claim 1 further comprising a system that confines the field of view of said detector.

3. The apparatus of claim 2 wherein said system includes means for directing the field of view of said infrared detector to any direction in the sky.

4. The apparatus of claim 3 wherein said means for directing the field of view includes a mechanism associated with said reflector wherein the directed field of view of the detector is steerable, either continuously or stepwise, to desired directions.

5. The apparatus of claim 4 wherein the directed field of view of the detector is steerable in azimuth and elevation above, at, or below the horizon.

6. The apparatus of claim 1 further comprising a plurality of infrared detectors that can be directed to stare in differing directions.

7. The apparatus of claim 6 wherein said plurality of detectors are either fixed in direction or steerable in azimuth and/or elevation.

8. The apparatus of claim 1 wherein said data processing means includes means for utilizing output from other observing systems such as radars, surface meteorological measurement systems, GPS and LIDARS.

9. The apparatus of claim 1 wherein an optical surface of said reflector is kept free of contamination from precipitation, aerosols, or particulate contaminants by means for applying a jet of clean and dry air directed at or across said reflector surface.

10. The apparatus of claim 9 wherein said jet of clean and dry air is warmed at said means for applying a jet to melt freezing or frozen precipitation.

11. The apparatus of claim 1 wherein said data processing means includes a computer capable of calculations, of storing, of displaying observational data, and of displaying processed data.

12. A method to determine present weather, nowcast weather, and forecast weather comprising the steps of:
    making ground based measurements including measurements of the time series or the angular position of infrared radiation emitted by the margins of clouds using an infrared temperature sensor; and
    processing said measurements to determine present weather, nowcast weather, and forecast weather.

13. The method of claim 12 further comprising the step of displaying observations and measurements of cloud-related atmospheric phenomena.

14. The method of claim 13 further comprising the step of recording the observations and measurements of atmospheric phenomena.

15. The method of claim 12 wherein the step of processing said measurements includes interpreting observations and measurements of atmospheric phenomena utilizing algorithms.

16. The method of claim 12 wherein the step of processing said measurements includes determining the height of remotely sensed cloud-related atmospheric phenomena.

17. The method of claim 12 wherein the step of processing said measurements includes determining the range of remotely sensed cloud-related atmospheric phenomena.

18. The method of claim 12 wherein the step of processing said measurements includes determining the horizontal distance of remotely sensed cloud-related atmospheric phenomena.

19. The method of claim 12 wherein the step of processing said measurements includes determining the percent sky coverage of remotely sensed cloud-related atmospheric phenomena.

20. The method of claim 12 wherein the step of processing said measurements includes determining the trend of the time series of per cent sky coverage of remotely sensed cloud-related atmospheric phenomena.

21. The method of claim 12 wherein the step of processing said measurements includes detecting and determining the type of atmospheric phenomenon from among phenomena such as fog, snow, rain, dust, and other atmospheric constituencies.

22. The method of claim 12 wherein the step of processing said measurements includes detecting and determining cloud type.

* * * * *